United States Patent [19]

Williams

[11] 4,358,925
[45] Nov. 16, 1982

[54] TEMPERATURE SENSING ASSEMBLY

[75] Inventor: Raymond L. Williams, Evendale, Ohio

[73] Assignee: The United States of America as represented by the Secretary of the Air Force, Washington, D.C.

[21] Appl. No.: 169,020

[22] Filed: Jul. 15, 1980

[51] Int. Cl.³ .............................................. F02C 7/18
[52] U.S. Cl. .................................. 60/39.07; 415/117
[58] Field of Search ................... 60/39.07; 236/86, 87; 415/117

[56] References Cited

U.S. PATENT DOCUMENTS 2,932,452 4/1960 Parker et al. ...................... 60/39.07
2,946,509 7/1960 Radtke et al. ......................... 236/87

Primary Examiner—Louis J. Casaregola
Attorney, Agent, or Firm—Donald J. Singer; Frank J. Lamattina

[57] ABSTRACT

A temperature sensing assembly which continuously senses the temperature of a constituent stream, of a flow of a gaseous medium; and, as a result of such sensing, generates pneumatic servo-pressure to drive air valves, which control the flow of the constituent stream, to open and shut in accordance with specific requirements. The assembly includes: a temperature sensing subassembly that senses the temperature of the constituent stream of gaseous flow and that further includes a plurality of adjacent, captively-held, bimetallic discs which contract or expand in accordance with preselected ranges of temperatures, and a co-acting spring-loaded ball valve subassembly; an air valve subassembly that selectively prevents the flow of a second constituent stream of the gaseous flow, in response to actuation of the temperature sensing subassembly; and, a conduit that interconnects the temperature sensing subassembly and the air valve subassembly, and that conducts the constituent stream, when flowing, from the latter to the former and then overboard.

6 Claims, 5 Drawing Figures

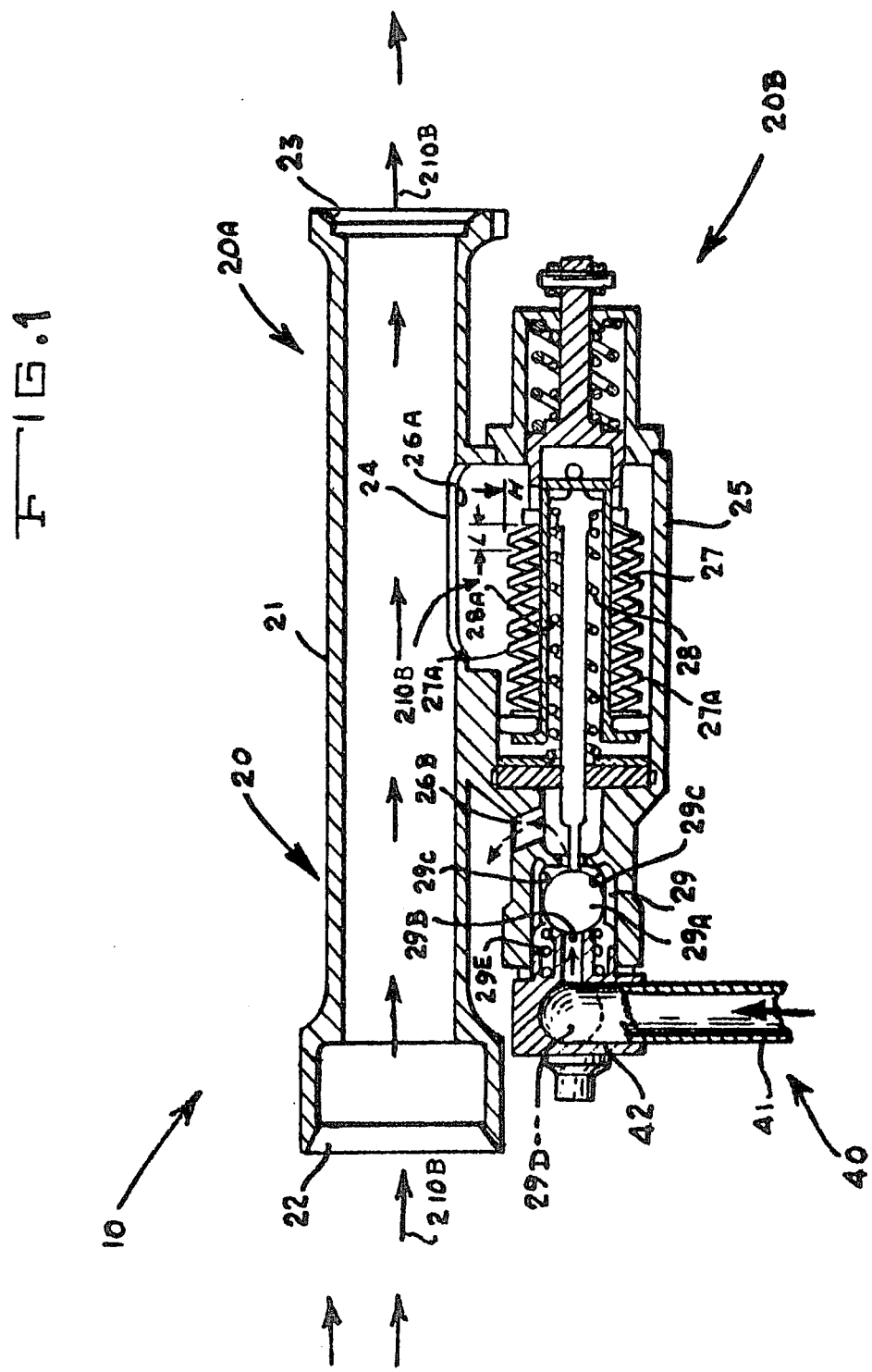

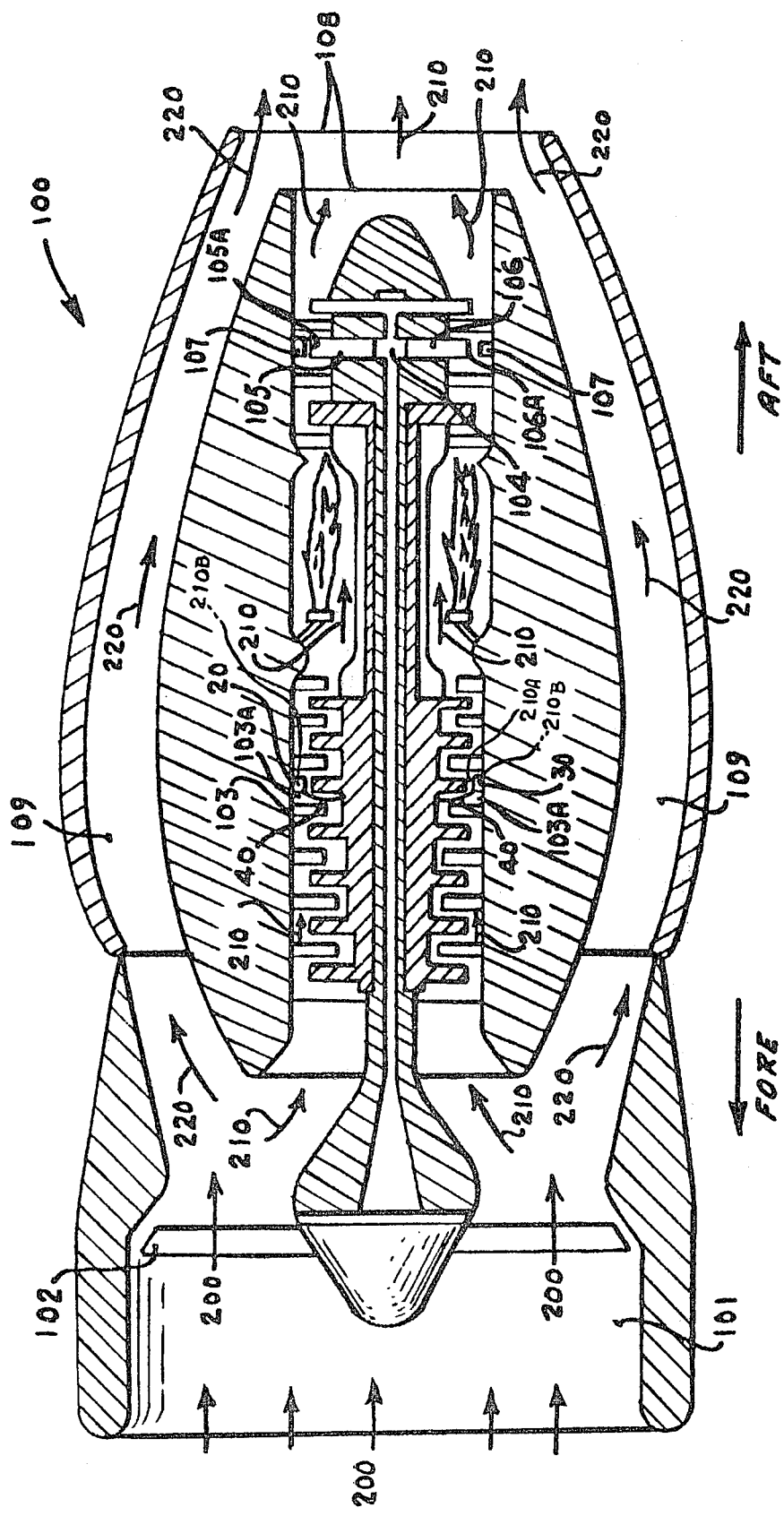

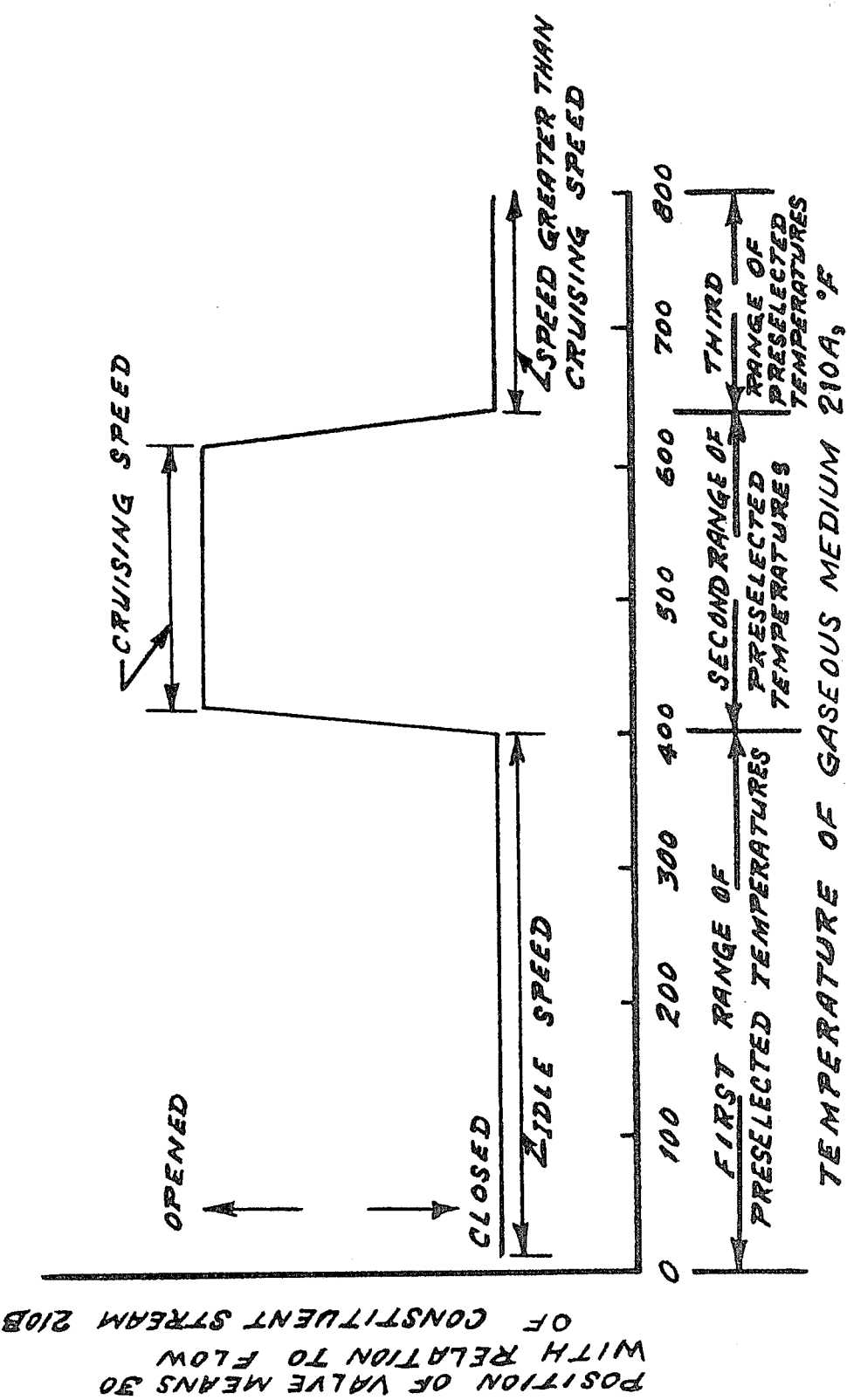

TEMPERATURE SENSING ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a temperature sensing assembly and, more particularly, to one that is adaptable for use with, and is ideally suited for use in combination with, a gas turbomachine. Said adaptation and use is by way of illustration only, and not because of any limitation, as will be explained later herein.

It often becomes necessary to sense the temperature of a constituent stream, of flow of a gaseous medium, and as a result of such sensing to generate pneumatic servo-pressure to drive air valves (controlling the flow of the constituent stream) to open and shut in accordance with specific requirements.

For example, in a gas turbomachine having a compressor, a turbine disposed aft of the compressor, turbine blades each having a tip and connected to the turbine, and a turbine shroud adjacent the tips of the turbine blades, where the tip of the turbine blades and the turbine shroud are in a close clearance relationship, and where the gas turbomachine operates over a wide range of temperatures and speeds during which the tips of the turbine blades and the turbine shroud thermally expand and contract at different rates, then it is desirable to maintain the clearance between the turbine tips and the turbine shroud, in order to prevent contact between the tips and the shroud, and also to increase the operating efficiency of the gas turbomachine.

I have invented a unique temperature sensing assembly that not only is adaptable for use in accomplishing the above-mentioned goals with regard to a gas turbomachine, but that also is useable in any environment where there are a constituent stream of a gaseous medium is to be sensed for temperature to generate pneumatic servo-pressure to drive air valves controlling the flow of the constituent stream.

By inventing such a temperature sensing assembly, I have significantly advanced the state-of-the-art.

SUMMARY OF THE INVENTION

The principal object of this invention is to provide a temperature sensing assembly for use with a flow of gaseous medium having a constituent stream, wherein the constituent stream has a changing temperature that is to be sensed continuously, and in response to said sensing, pneumatic servo-pressure is generated and is used to drive an air valve to prevent (or permit) flow of the constituent stream.

This principal object, as well as related objects (such as reliability of the assembly), of the invention will become readily apparent after a consideration of the description of the invention, together with reference to the contents of the Figures of the drawings.

DESCRIPTION OF THE DRAWINGS

FIG. 1 is a side elevation view in simplified form, both pictorial and schematic, and partially in cross section, of a preferred embodiment of a major component assembly of the invention;

FIGS. 3A and 3B are side elevation views also in simplified form, both pictorial and schematic, and partially in cross section of a representative gas turbomachine with which the invention has been combined for use; and, FIG. 4 is a graph showing how the servo-valve portion of the invention is in the desired open or closed position, as is required in accordance with the speed and the preselected range of temperatures at which the gas turbomachine, as shown in FIGS. 3A and 3B, is operating.

DESCRIPTION OF THE PREFERRED EMBODIMENT

Figure 2:
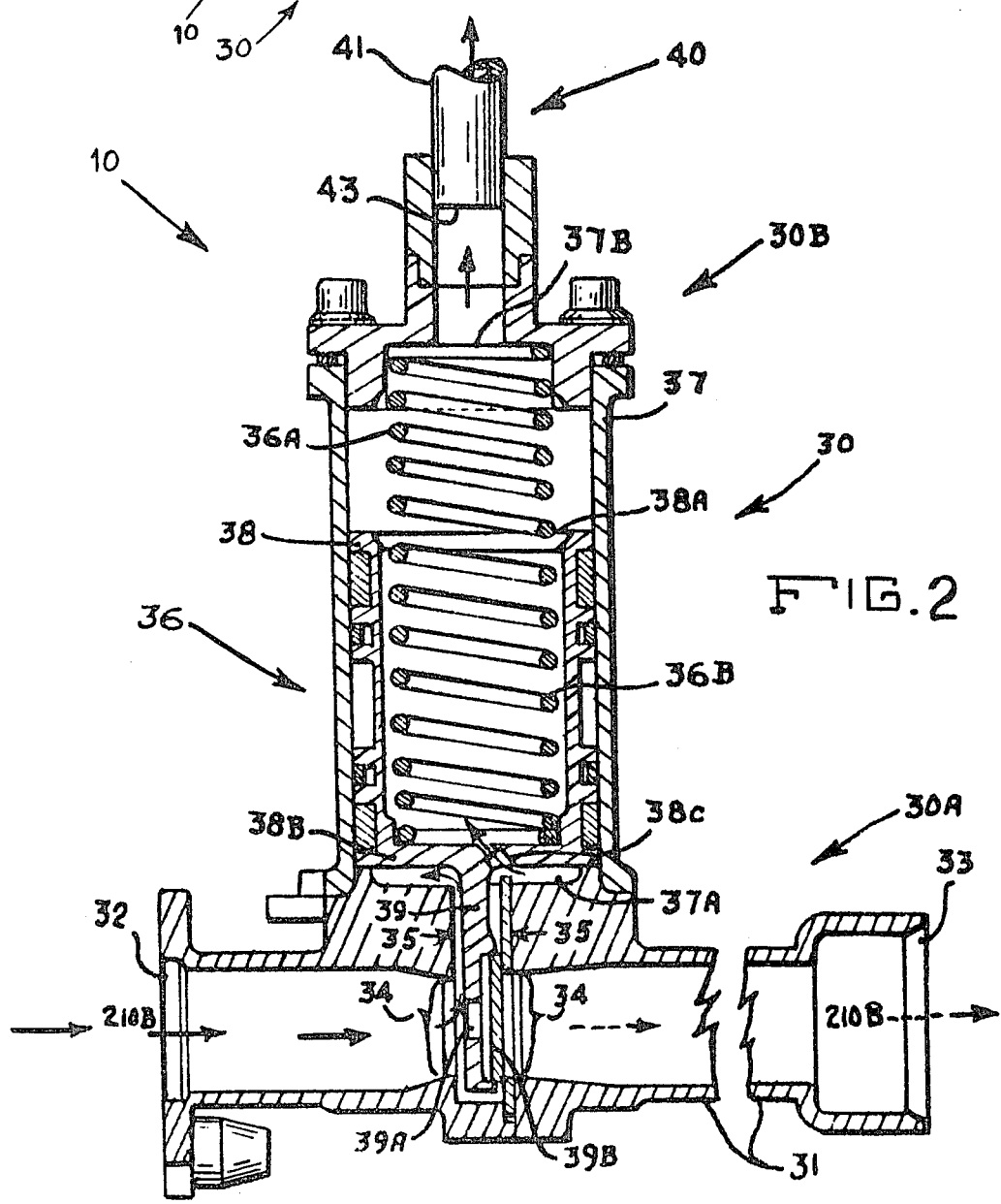
FIG. 2 is a side elevation view, also in simplified form, both pictorial and schematic, and partially in cross section, of a preferred embodiment of the other major component assembly of the invention.

With reference to FIGS. 1-3, inclusive, and more particularly with reference to FIGS. 1 and 2, therein is shown a preferred embodiment 10 of the invention.

As a preliminary matter, it is to be noted and remembered that the invention 10 is for use with a flow of gaseous medium 210A, FIGS. 1-3, inclusive, which comprises (but need not be limited to) a constituent stream 210B, FIGS. 1-3, inclusive, with the constituent stream 210B having changes in temperature.

In the most basic and generic structural form, the invention 10 comprises: a means (generally designated 20, FIGS. 1 and 3) for continuously sensing changes in temperature of the constituent stream 210B, with this means 20 disposed such as to be in the flow of this stream 21-B; a means (generally designated 30, FIGS. 2 and 3), that is responsive to temperature-change sensing means 20, for selectively preventing the flow of the constituent stream 210B, with this means 30 having a portion that is disposed across the flow of the constituent stream 210B; and, a means (generally designated 40, FIGS. 1-3, inclusive) for operatively connecting temperature-change sensing means 20 to responsive, servo-mechanism, flow-preventing means 30.

With reference to FIGS. 1-3, inclusive, the means 40 for operatively connecting temperature change sensing means 20 to servo-mechanism flow-preventing means 30, comprises (as a matter of preference and not as a matter of limitation) a gas impervious conduit (such a 41) that has a first end 42 connected to an opening (such as 29D, FIG. 1) in the means 20 and a second end 43 connected to an opening (such as 37B, FIG. 2). Such a gas impervious conduit 41 may be, but need not be, a tube.

More specifically, and with reference particularly to FIG. 1, the means 20 for continuously sensing changes in temperature of the constituent stream 210B basically comprises two interacting portions, i.e., a stream flow-through portion 20A and a temperature-change sensing portion 20B. The stream flow-through portion 20A is in the structural form of a pipe (such as 21) having a first end 22 (upstream of the flow 210B) and a second end 23 (downstream of the flow 210B), as a result of which the constituent stream 210B flows into the first end 22 and flows out of the second end 23. In addition, the pipe 21 has an opening (such as 24) that is located at a position intermediate of the pipe ends 22 and 23, and across which opening 24 the constituent stream 210B flows and into which opening 24 a portion of the stream 210B flows. The temperature-change sensing portion 20B is disposed adjacent to, and is connected to, and also is in communication with the stream flow-through portion 20A.

With reference particularly to FIG. 2, and more specifically with regard to the means 30 for selectively preventing the flow of the constituent flow 210B, this means 30 basically comprises two interacting portions, i.e., a stream flow-through portion 30A and an air valve subassembly portion 30B. The stream flow-through portion 30A is in the structural form of a pipe (such as 31) having a first end 32 (upstream of the flow 210B) and a second end 33 (downstream of the flow 210B), as a result of which the constituent stream 210B flows into the first end 32 and flows out of the second end 33. In addition, the pipe 31 has a reduced diameter (generally designated 34), with an opening (such as 35) therein, with the reduced diameter 34 and the opening therein 35 positioned at a location that is intermediate the first and second ends 32 and 33 of the pipe 31.

Referring back to FIG. 1, and with reference particularly to the temperature-change sensing portion 20B of the temperature-change sensing means 20, this portion 20B preferably comprises: a housing (such as 25) that is connected to the stream flow-through portion 20A of this means 20, and that has a first opening (such as 26A) that is in communication with the opening 24 which is the opening intermediate the pipe ends 22 and 23, and a second opening 26B that leads into an ambient environment, i.e., "overboard", external of the housing 25 of the temperature sensing assembly 10; means (generally designated 27), that is disposed internal of the housing 25, for contracting and for expanding, in response to changes of temperature of the constituent stream 210B; means (generally designated 28) for biasing the means for contracting and expanding 27 against expansion, with this biasing means 28 disposed internal of the housing 25; and a valve subassembly (such as 29) that is operatively associated with the contracting and expanding means 27, and that is in communication with second opening 26B of housing 25.

Still with reference to FIG. 1, the means for contracting and for expanding 27 (in response to changes of temperature of the constituent stream 210B), includes a plurality of adjacent, captively-held, bimetallic discs (each of which is similarly designated 27A), each of which has a length "L" and a height "H", as shown in FIG. 1. Each bimetallic disc 27A of this plurality: contracts, by decreasing in length and by simultaneously increasing in height, when the temperature of the constituent stream 210B (to which it is exposed) falls to a temperature within a first preselected range of temperatures; expands partially (i.e., does not expand fully) by increasing in length and by simultaneously decreasing in height, when the temperature of the constituent stream 210B (to which it is exposed) rises to a temperature within a second preselected range of temperatures; and, expands fully by further decreasing in height, when the temperature of the constituent stream 210B (to which it is exposed) rises to a temperature within a third preselected range of temperatures. It is to be noted that the means 27 and its constituent bimetallic discs 27A are shown in the fully expanded condition in FIG. 1. It is also to be noted that, because means 27 includes the bimetallic discs 27A, the biasing means 28 includes a spring 28A, preferably of the helical type (i.e., whose windings are uniformly round).

Still with reference to FIG. 1, and still with reference to the temperature-change sensing portion 20B, the aforementioned valve subassembly 29 of this portion 20B preferably comprises a spring-loaded ball valve subassembly 29 which, in turn, includes a ball member 29A that is captively held by a spring 29E between a first seat 29B, and a second seat 29C that is diametrically disposed (or opposed) with relationship to the first seat 29B, and with the ball member 29A selectively positionable: in the first seat 29B, and thereby closing the valve 29, as is shown in FIG. 1; in the second seat 29C, and thereby closing the valve 29; and, in a location that is intermediate of the first seat 29B, and of the second seat 29C, and thereby opening the valve 29. It is here to be noted that the ball valve subassembly 29: has an opening (such as 29D) therein, adjacent to and in communication with the first seat 29B, to which is connected the first end 42 of the conduit 41 of the means 40 for operatively connecting temperature-change sensing means 20 to flow-prevention means 30, FIG. 2.

As a result, when the bimetallic discs 28A of the means for contracting and for expanding 28 contract, the ball member 29A of the ball valve subassembly 29 is thereby caused to be positioned in the second seat 29C, closing the opening 29D that is connected to conduit (i.e., tube) 41. Similarly, when the bimetallic discs 28A expand fully, the ball member 29A is thereby caused to be positioned in the first seat 29B, also closing the opening 29D, as is shown in FIG. 1. However, when the bimetallic discs 27A expand partially, the ball member 29A is thereby caused to be positioned in a location that is intermediate of the first and second seats 29B and 29C, leaving the opening 29D open.

Now, with reference to FIG. 2, and more particularly with reference to the valve assembly portion 30B of the flow-prevention means 30, the portion 30B includes an air valve assembly (generally designated 36) which further includes: a cylinder-like member 37 that is disposed adjacent to the stream flow-through portion 30A of this means 30, with this member 37 having a first end opening 37A and a second end opening 37B, and with the first end opening 37A in communication with the reduced diameter opening 35 and with the second end opening 37B connected to the second end 43 of the conduit 41 of the means 40 for connecting means 20 t means 30; a piston-like member 38 disposed, and movable, within, the cylinder-like member 37, with this member 38 having an open first end 38A that faces the second end opening 37B of the cylinder-like member 37, and a closed second end 38B that faces the reduced diameter opening 35 and that has an opening 38C therein (i.e., in the closed second end 38B); a rod 39 that extends from the closed second end 38B of the piston 38 to and through the reduced diameter opening 35, and that is disposed in a position across the stream flow-through portion 30A of this means 30 at the location of the reduced diameter 34, with this rod 39 having a closeable opening 39A in communication with the flow of the constituent stream 210B, and with this rod 39 also having a captively-held, pressure-responsive, movable disc member 39B that is disposed opposite the rod opening 39A, with this disc member 39B functioning to selectively close the closeable opening 39A of the rod 39; and, means (generally designated 36A) for biasing the rod 39 against movement out of the diposed position across the reduced diameter 34 of pipe 31, with this biasing means 36A disposed internal of the piston-like member 38 and of the cylinder-like member 37. As a matter of preference, the biasing means 36A includes a spring 36B, preferably of the helical type (i.e., whose windings are uniformly round).

It is here to be noted, and to be remembered, that this invention is adaptable for use with, and is ideally suited for use in combination with a gas turbomachine (see: Background of the Invention, hereinbefore), such as the aircraft turbofan engine 100, FIG. 3, which is shown therein with "Fore" and "Aft" directional designations to better orient the reader. With reference to said engine 100, and to FIG. 3, the engine 100 includes: an air inlet 101; a fan 102; a compressor 103; a turbine 104 disposed aft of the compressor 103; turbine blades, such as 105 and 106, connected to the turbine 104, and with each blade having a tip, such as 105A and 106A; and, a turbine shroud 107 adjacent the turbine blade tips 105A and 106A and in close clearance relationship thereto, as is shown in FIG. 3. Also shown is the intake air flow 200 which divides into the primary jet flow 210 (sometimes also referred to after compression as the "compressor air flow" or as "cooling air"), and the fan duct bypass air flow 220 which moves aft toward the exhaust nozzle 108 of the engine 100 by flowing in the fan duct 109 of the engine. The flows 210 and 220 meet and exhaust at nozzle 108.

Figure 3B:
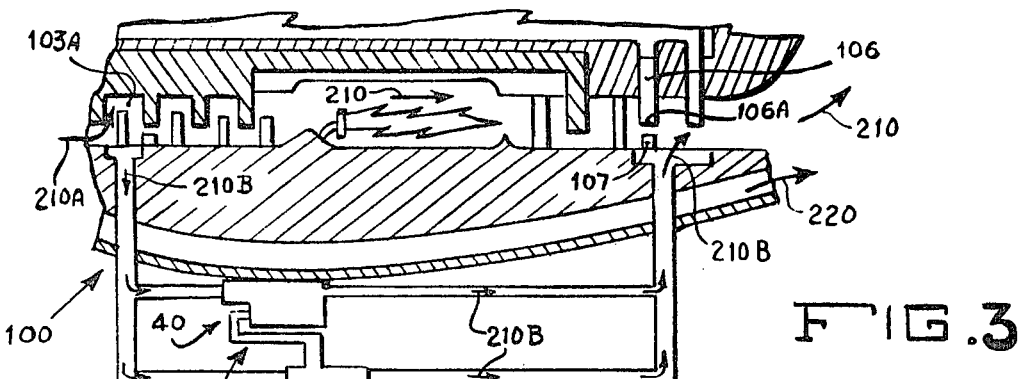

It is also to be noted with reference to engine 100 and FIGS. 3A and 3B: that the engine 100 operates over a wide range of temperatures and speeds, during which the turbine blade tips 105A and 106A and the associated shroud 107 thermally expand and contract at different rates; that the "gaseous medium" referred to herein is designated 210A, while the constituent stream thereof is designated, 210B, and that both flow from a preselected stage of the compressor 103 by different routes to the turbine blade tips 105A and 106A and to the associated shroud 107, as shown in FIGS. 3A and 3B, whenever the engine operates; and that the temperature of the gaseous medium 210A and of the constituent stream thereof 210B, rise in temperature with increase in speed of the engine 100.

In this adaptation, combination, and use the major components 20, 30 and 40 of the invention 10 are disposed as follows: the means 20 for continuously sensing changes in temperature of the constituent stream 210B of the flow of gaseous medium 210A is disposed as previously set forth herein, and in addition is also concurrently diposed at a location that is intermediate the compressor 103 and the turbine 104, preferably at the 5th stage 103A of the compressor 103, as shown in FIG. 3; the means 30 for selectively preventing the flow of the constituent stream 210B of the flow of gaseous medium 210A is disposed as previously set forth herein, and in addition is also concurrently disposed at a location that is intermediate the compressor 103 and the turbine 104, preferably at the 5th stage 103A of the compressor 103, as shown in FIGS. 3A and 3B; and, the interconnecting means 40 is disposed as previously set forth herein, such as is shown in FIGS. 3A and 3B.

With reference to FIG. 4, it is here to be noted, that: when the gas turbomachine 100, FIG. 3, operates at idle speed, the temperature of the constituent stream 210B is within the aforesaid first preselected range of temperatures; when the gas turbomachine 100 operates at cruising speed, the temperature of the constituent stream 210B is within the aforesaid second preselected range of temperatures; and, when the gas turbomachine operates at speeds greater than cruising speed, the temperature of the constituent stream 210B is within third the aforesaid third preselected range of temperatures.

With reference to FIGS. 3A and 3B and 4, and as can be seen from the graph in FIG. 4, the constituent stream 210B is prevented by means 30 from flowing from the compressor 103 to the turbine blade tips 105A and 106A and to the turbine shroud 107, when the gas turbomachine is operated at idle speed, (i.e., within the first preselected range of temperatures) and at speeds greater than cruising speeds (i.e., within the third preselected range of temperatures); but, the constituent stream 210B is not prevented by means 30 from flowing from the compressor 103 to the turbine blade tips 105A and 106A and to the turbine shroud 107, when the gas turbomachine 100 is operated at crusing speed (i.e., within the second preselected range of temperatures). As a result, the close clearance between the turbine blade tips 105A and 106A and the turbine shroud 107 is maintained; contact between the tips 105A and 106A and the shroud 107 is prevented; and, the operating efficiency of the gas turbomachine 100 is increased.

MANNER OF OPERATION OF THE INVENTION

The manner of operation of the invention 10, FIGS. 103, inclusive, per se and also as used in combination with a gas turbomachine 100, FIGS. 3A and 3B, can be easily ascertained by any person or ordinary skill in the art from the going description, coupled with reference to the contents of the Figures of the drawings.

For others, the following simplified explanation is given:

Assuming that in the first preselected range of temperatures, FIG. 4, there is to be no flow of constituent stream 210B, FIGS. 2 and 3 (i.e., no "cooling flow") to the turbine tips 105A and 106A and to the turbine shroud 107, FIG. 3. This range of temperatures corresponds to the idle speed, FIG. 4, of the gas turbomachine 100, FIGS. 3A and 3B. In this first range of temperatures, which is considered "low", the bimetallic discs 27A, FIG. 1, sense this "low" temperature of the constituent stream 210B and react accordingly (i.e, contract). This causes the spring-loaded ball 29A, FIG. 1, to move against second seat 29C, FIG. 1, stopping an exhaust air bleed flow that is coming from the valve subassembly 26, FIG. 2. This action forces the pressure within the chamber defined by the cylinder 37, FIG. 2, and the open end of the piston 38, FIG. 2, to rise to the level of the pressure of the stream 210B that is coming from the compressor 103. This pressure there is, or becomes, the same on both sides of the piston 38. Therefore, with the differential pressure across the piston 38 equal to zero, the force of the valve spring 36A will close the air valve, i.e., move the piston 38 and piston rod 39 down, thereby stopping the flow of stream 210B to the turbine tips 105A and 106A and to the shroud.

When the temperature of the constituent stream 210B, FIG. 1, rises to a temperature within the second preselected range of temperature, such as 400 degrees Fahrenheit, FIG. 4 (i.e., which corresponds to the cruising speed of the gas turbomachine 100, FIG. 3) the bimetallic discs 27A, FIG. 1, expand slightly, forcing the ball member 29A off of seat 29C. This action creates a reduction of servo-pressure behind the air valve 36, i.e., behind the closed end 38B of the piston 38 in the void in the first end 37A of the cylinder 37, because of a restriction bleed, i.e., opening 38C in piston 38. The chamber defined by the cylinder 37 and the open end of the piston 38 is vented through the conduit 41 FIGS. 1 and 2, through opening 29D, FIG. 1, through valve means 29, FIG. 1, and through opening 26B to "overboard", i.e., external of the invention 10. In this regard, it is to be noted that the invention does not have a captive air circuit. The exhausted air is spent. As a result of this venting, a differential pressure is created across the piston 38, FIG. 2, which is sufficient to overcome the return force of spring 36A, and to open the air valve 36, i.e., to force the rod 39 to move upwardly and out of opening 35, thereby permitting constituent stream 210B to flow from the compressor 103 to the turbine blade tips 105A and 106A and to the turbine 107, FIGS. 3A and 3B.

When the temperature of the constituent stream 210B continues to rise to a temperature within the third preselected range of temperatures, such as to approximately 635 degrees Fahrenheit, FIG. 4 (i.e., which corresponds to speeds greater than cruising speed of the gas turbomachine 100, FIGS. 3A and 3B), the bimetallic discs 27A, FIG. 1, expand fully, forcing the ball member 29A into seat 29B, FIG. 1, again blocking the air bleed flow from the valve assembly 36. This causes the piston 38 to be driven downwardly by spring 36A, and thereby also causes piston rod 39 downwardly through the opening 35 and into the reduced diameter section 34. Thereby, the flow of the constituent stream 210B is stopped, and no "cooling air" gets to the turbine blade tips 105A and 106A or to the turbine shroud 107.

CONCLUSION

It is abundantly clear from all of the foregoing, and from the contents of the Figures of the drawings, that the stated desired principal object, as well as related objects, of this invention have been achieved.

It is to be noted that, although there have been described and shown the fundamental and unique features of the invention 10, as applied to a preferred embodiment, FIGS. 1 and 2, and as adapted for use in combination with a gas turbomachine, FIGS. 3A and 3B and 4, other embodiments, variations, adaptations, substitutions, additions, omissions, and the like may occur to, and can be made by, those of ordinary skill in the art, without departing from the spirit of the invention. For example, although the invention 10 is shown for use in combination with an aircraft turbofan engine 100, FIGS. 3A and 3B, the invention may be adapted for use in combination with any gas turbine engine power plant.

What is claimed is:

1. A temperature sensing assembly for use with a flow of gaseous medium having a constituent stream with a changing temperature, comprising;

a. means for continuously sensing changes in temperature of said constituent stream of said flow of gaseous medium, wherein a portion of this means is disposed such as to be in said flow of said constituent stream, and wherein this means includes:

a stream flow-through portion in the structural form a pipe having a first end and a second end, with said pipe disposed such that said constituent stream flows into said first end and flows out of said second end, and with said pipe having an opening located at a position intermediate to said ends, across which opening said stream flows and into which opening a portion of said stream enters; and a temperature change sensing portion disposed adjacent to and connected to said stream flow-through portion of this means, with said temperature change sensing portion in communication with said stream flow-through portion, wherein said temperature change sensing portion comprises:

(1) a housing connected to said stream flow-through portion of this means, wherein this housing has a first opening and a second opening, with said first opening in communication with said opening in said stream flow-through portion of this means, and with said second opening leading into an ambient environment external of this housing and external of this means;

(2) means, disposed internal of said housing, for contracting and for expanding, in response to changes of temperature of said constituent stream, wherein this means includes a plurality of adjacent, captively-held, bimetallic discs, each of which has a length and a height, and wherein each metallic disc of said plurality:

contracts, by decreasing in length and by simultaneously increasing in height, when said temperature of said constituent stream falls to a temperature within a first preselected range of temperatures;

expands partially, by increasing in length and by simultaneously decreasing in height, when said temperature of said constituent stream rises to a temperature within a second preselected range of temperatures;

and expands fully, by further increasing in length and by simultaneously further decreasing in height, when said temperature of said first constituent stream rises to a temperature within a third preselected range of temperatures;

(3) means for biasing said means for contracting and for expanding against increase in length, with this biasing means disposed internal of said housing; and (4) a spring-loaded ball valve subassembly operatively associated with said means for contracting and for expanding, wherein said ball valve subassembly includes a ball member that is captively held by a spring between a first seat and a second seat that is diametrically disposed with relationship to said first seat, with said ball member selectively positionable:

in said first seat, and thereby closing said valve;

in said second seat, and thereby closing said valve;

and, in a location intermediate said first seat and said second seat, and thereby opening said valve and, wherein said ball valve subassembly has an opening therein, adjacent to and in communication with said first seat;

b. means, responsive to actuation of said means for continuously sensing changes in temperature of said constituent stream of flow, for selectively preventing said flow of said constituent stream, wherein a portion of this flow-prevention means is disposed across said flow of said constituent stream; and c. means for operatively connecting said means for continuously sensing changes in temperature of said constituent stream to said means for selectively preventing said flow of said constituent stream, and for allowing said means for selectively preventing said flow of said constituent stream to be responsive to actuation of said means for continuously sensing changes in temperature of said constituent stream of flow, wherein this means comprises a gas impervious conduit having a first end connected to an opening in said means for continuously sensing changes in temperature of said constituent stream, and having a second end connected to an opening in said means for selectively preventing said flow of said constituent stream.

2. A temperature sensing assembly, as set forth in claim 1 wherein said means for selectively preventing said flow of said constituent stream includes:
   a. a stream flow-through portion in the structural form of a pipe having a first and a second end, with this pipe disposed such that said constituent stream flows into said first end and flows out of said second end, with said pipe having a reduced diameter, with an opening therein, at a location intermediate said first end and said second end; and
   b. an air valve subassembly portion for selectively preventing said flow of said constituent stream, with this portion disposed adjacent to and connected to said stream flow-through portion at said reduced diameter opening thereof, wherein this valve subassembly portion includes an air valve subassembly that further includes:
     (1) a cylinder-like member disposed adjacent said stream flow-through portion of this means, with said cylinder-like member having a first end opening and a second end opening, and with said first end opening in communication with said reduced diameter opening of said stream flow-through portion of this means and with second end opening connected to said second end of said conduit of said means for operatively connecting said means for continuously sensing changes in temperature of said constituent stream to this means;
     (2) a piston-like member dispersed, and movable, within said cylinder-like member, with this piston-like member having a first end and a second end, and with said first end being open and disposed facing said second end opening of said cylinder-like member, and with said second end being closed, having an opening therein, and facing said reduced diameter opening;
     (3) a rod extending from said closed second end of said piston-like member, to and through said reduced diameter opening of said stream flow-through portion of this means, and disposed in a position across said stream flow-through portion of this means at said location of said reduced diameter, with said rod having a closeable opening in communication with said flow of said constituent stream, and with said rod also having a captively held, pressure-responsive, movable disc member disposed opposite said rod opening, wherein said disc member functions to selectively close said closeable opening; and
     (4) means for biasing said rod against movement out of said disposed position across said stream flow-through portion of this means, with this biasing means disposed internal of said piston-like member and said cylinder-like member.

3. A temperature sensing assembly, as set forth in claim 2, in combination with a gas turbomachine having a compressor, a turbine disposed aft of said compressor, turbine blades each having a tip and connected to said turbine, and a turbine shroud adjacent said tips of said turbine blades, wherein said tips of said turbine blades and said turbine shroud are disposed in a close clearance relationship, and wherein said gas turbomachine operates over a wide range of temperatures and speeds during which said tips of said turbine blades and said turbine shroud thermally expand and contract at different rates, and also wherein said constituent stream of said flow of said gaseous medium flows from said compressor to said tips of said turbine blades and to said turbine shroud whenever said gas turbomachine operates, with said gaseous medium and said constituent stream thereof rising in temperature with increase of speed of said gas turbomachine, and further wherein:
   a. said means for continuously sensing changes in temperature of said constituent stream of said flow of gaseous medium is concurrently disposed at a position intermediate said compressor and said turbine;
   b. said means, responsive to actuation of said means for continuously sensing changes in temperature of said constituent stream of flow, for selectively preventing said flow of said constituent stream of said flow of gaseous medium is concurrently disposed at a position intermediate said compressor and said turbine;
   c. when said gas turbomachine operates at this speed, said temperature of said constituent stream of gaseous flow is within the aforesaid first preselected range of temperatures;
   d. when said gas turbomachine operates at crusing speed, said temperature of said constituent stream of gaseous flow is within the aforesaid second preselected range of temperatures; and
   e. when said gas turbomachine operates at speeds greater than cruising speed, said temperature of said constituent stream of gaseous flow is within the aforesaid third preselected range of temperatures;
   whereby said constituent stream of flow of said gaseous medium is prevented from flowing from said compressor to said turbine blade tips and to said shroud when said gas turbomachine is operated at idle speed and at speeds greater than cruising speed, and whereby said constituent stream of flow of said gaseous medium is permitted to flow from said compressor to said turbine blade tips and to said shroud when said gas turbomachine is operated at cruising speed, thereby maintaining said close clearance between said turbine blade tips and said shroud, and preventing contact between said tips and said shroud, and also increasing operating efficiency of said gas turbomachine.

4. A temperature sensing assembly, as set forth in claim 3, wherein said gas impervious conduit of said means for operatively connecting said means for continuously sensing changes in temperature of said constituent stream to said means for selectively preventing said flow of said constituent stream is a tube.

5. A temperature sensing assembly, as set forth in claim 4, wherein said means for biasing said means for contracting and for expanding against increase in length, of said means for continuously sensing changes in temperature of said first constituent stream includes a spring.

6. A temperature sensing assembly, as set forth in claim 5, wherein said means for biasing said rod, of said air valve subassembly of said means for selectively preventing flow of said constituent stream, against movement out of said position across said stream flow-through portion, includes a spring.

* * * * *